(12) United States Patent
Kastner

(10) Patent No.: US 7,883,782 B2
(45) Date of Patent: Feb. 8, 2011

(54) THREE COMPONENTS LINKED TO EACH OTHER BY MEANS OF A WELDED CONNECTION

(75) Inventor: Bernd Kastner, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 1403 days.

(21) Appl. No.: 10/490,383

(22) PCT Filed: Sep. 26, 2002

(86) PCT No.: PCT/EP02/10784

§ 371 (c)(1),
(2), (4) Date: Aug. 13, 2007

(87) PCT Pub. No.: WO03/031112

PCT Pub. Date: Apr. 17, 2003

(65) Prior Publication Data

US 2009/0274925 A1  Nov. 5, 2009

(30) Foreign Application Priority Data

Oct. 4, 2001  (DE) ................................ 101 49 167

(51) Int. Cl.
*F16L 21/02* (2006.01)
*F16L 21/06* (2006.01)

(52) U.S. Cl. .......................... 428/597; 285/55; 285/417; 219/59.1

(58) Field of Classification Search ....................... None
See application file for complete search history.

(56) References Cited

U.S. PATENT DOCUMENTS

| | | | | |
|---|---|---|---|---|
| 5,447,339 A | * | 9/1995 | Marchal et al. | 285/47 |
| 5,566,984 A | * | 10/1996 | Abbema et al. | 285/22 |
| 6,172,333 B1 | * | 1/2001 | Stava | 219/137 PS |
| 6,231,086 B1 | * | 5/2001 | Tierling | 285/123.15 |
| 6,375,228 B1 | * | 4/2002 | Klemm et al. | 285/47 |
| 6,494,234 B2 | * | 12/2002 | Esser | 138/109 |
| 6,494,501 B2 | * | 12/2002 | Gotoh | 285/371 |
| 6,874,317 B2 | * | 4/2005 | Sugaya et al. | 60/323 |
| 2001/0012476 A1 | * | 8/2001 | Louis et al. | 405/168.2 |

FOREIGN PATENT DOCUMENTS

| EP | 1025 944 A | 8/2000 |
|---|---|---|
| EP | 1025943 A | 8/2000 |

* cited by examiner

*Primary Examiner*—Jennifer C McNeil
*Assistant Examiner*—Jason L Savage
(74) *Attorney, Agent, or Firm*—Bacon & Thomas, PLLC

(57) ABSTRACT

A pore-free weld connection and a method for manufacturing such a weld connection between first, second and third components (1, 3, 5, 13, 15, 17), which are connected together by means of a closed weld seam (7, 18), and of which one component (5, 17) has, at a start- and end-point (9, 11, 21, 23) of the weld seam (7, 18), a cavity (6, 19) serving for a root-side degassing of a weld puddle.

5 Claims, 5 Drawing Sheets

THREE COMPONENTS LINKED TO EACH OTHER BY MEANS OF A WELDED CONNECTION

The invention relates to three components connected by a weld connection and a method for producing such a connection.

Weld connections between three components are very common.

They arise e.g. whenever two components are welded together with an exact fit without edge offset, using a centering sleeve. In such case, e.g. an end piece of the first component and an end piece of the second component are each pushed onto the centering sleeve such that the two end pieces lie tightly against one another. The centering sleeve has for this purpose a shape matching the shape of the end pieces. Following this assembly, e.g. a welding torch is used to draw a single, annular weld seam.

An almost identical weld connection occurs, when a puddle containment is used to prevent root break through, i.e. an escape of material melted in the welding process into an internal space enclosed by two components that are being joined. The shape of the puddle containment is essentially the same as the shape of the centering ring.

An analogous weld connection happens, of course, when three components mutually abutting along a connection line are joined together.

In all the above-mentioned instances, the weld seam forms a closed line. In the course of such practice, the problem occurs very frequently that pores form at the location where weld seam end meets weld seam start. Pores in the weld seam lead to decreased mechanical strength and lessened corrosion resistance of the weld connection. Moreover, the ability of the connection to resist pressure can be degraded. This last presents e.g. problems, when the weld connection forms part of a pressure-tight, e.g. flameproof, encapsulation.

It is true that pore frequency can be considerably reduced by slowing the welding process drastically, e.g. to welding speeds below 6 cm/min, but this is uneconomic for many applications.

It is an object of the invention to provide three components connected with one another by a pore-free weld.

To this end, the invention comprises a first, a second and a third component
- which are connected with one another by means of a single, closed welding seam, and
- of which one component has, at a start- and end-point of the weld seam, a cavity, which serves the purpose of enabling a root-side degassing of a weld puddle.

In a first embodiment, the third component is a centering ring, onto which the first and second components are pushed.

In a second embodiment, the third component is a puddle containment, onto which the first and second components are pushed.

In a third embodiment, the first component is a membrane, or diaphragm, the second component a tube and the third component a holder inserted into the tube.

Additionally, the invention includes a method for manufacturing one of the above-mentioned weld connections,
- in which
- the first, second and third components are positioned in preparation for welding,
- the welding is begun in the area of the cavity,
- continued without interruption, and
- ended where it was begun in the area of the cavity.

The invention and additional advantages will now be explained in greater detail on the basis of the figures of the drawing, in which three examples of embodiments of weld connections are presented; equal elements are provided in the figures with the same reference characters.

Figure 1:
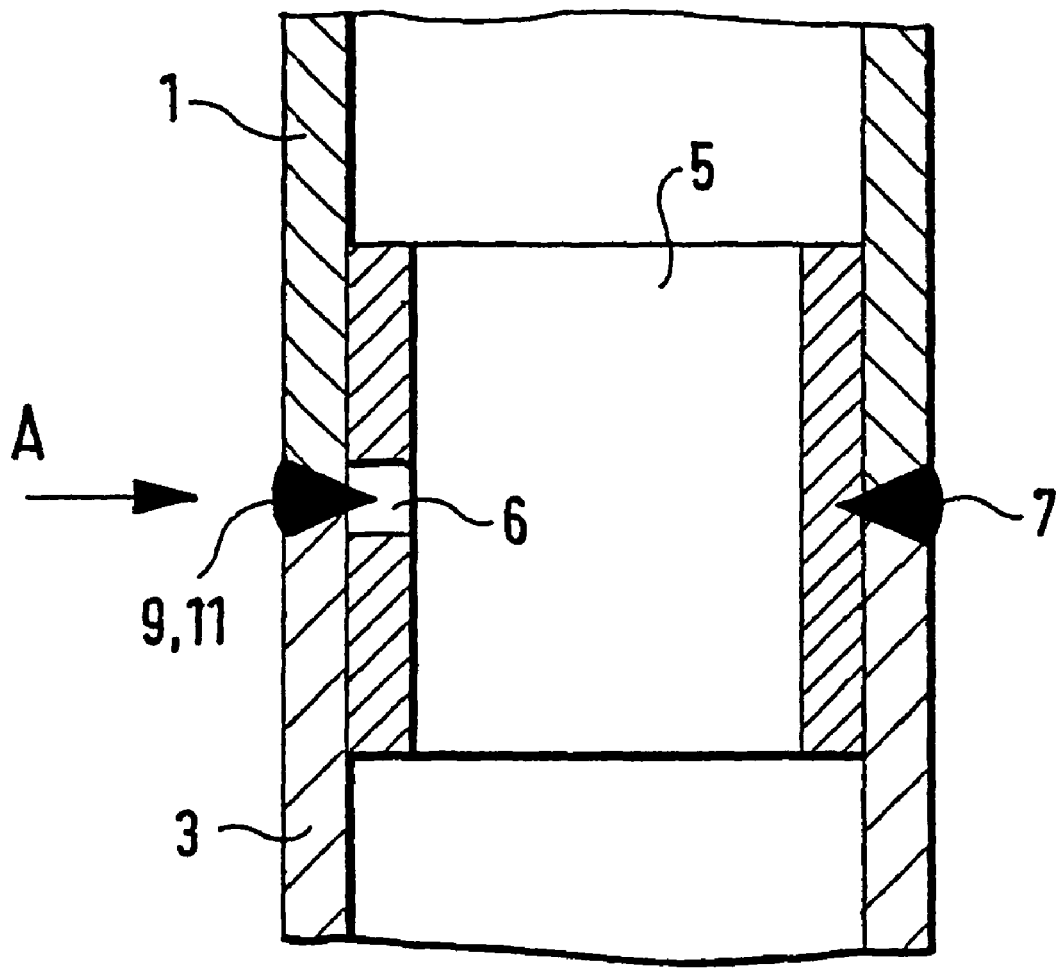
FIG. 1 shows a weld connection between two cylindrical components and a centering ring or puddle containment.

FIG. 1 shows a sectional drawing of a weld connection between first, second and third components 1, 3, 5. The first and second components 1, 3 are cylinders of equal inner diameter and neighbor one another at their ends. The third component 5 is likewise a cylinder, having an outer diameter, which is equal to the inner diameter of the first and second components 1, 3.

The first and second components are each pushed onto the third component 5 so that they lie closely against one another and the third component 5.

Figure 2:
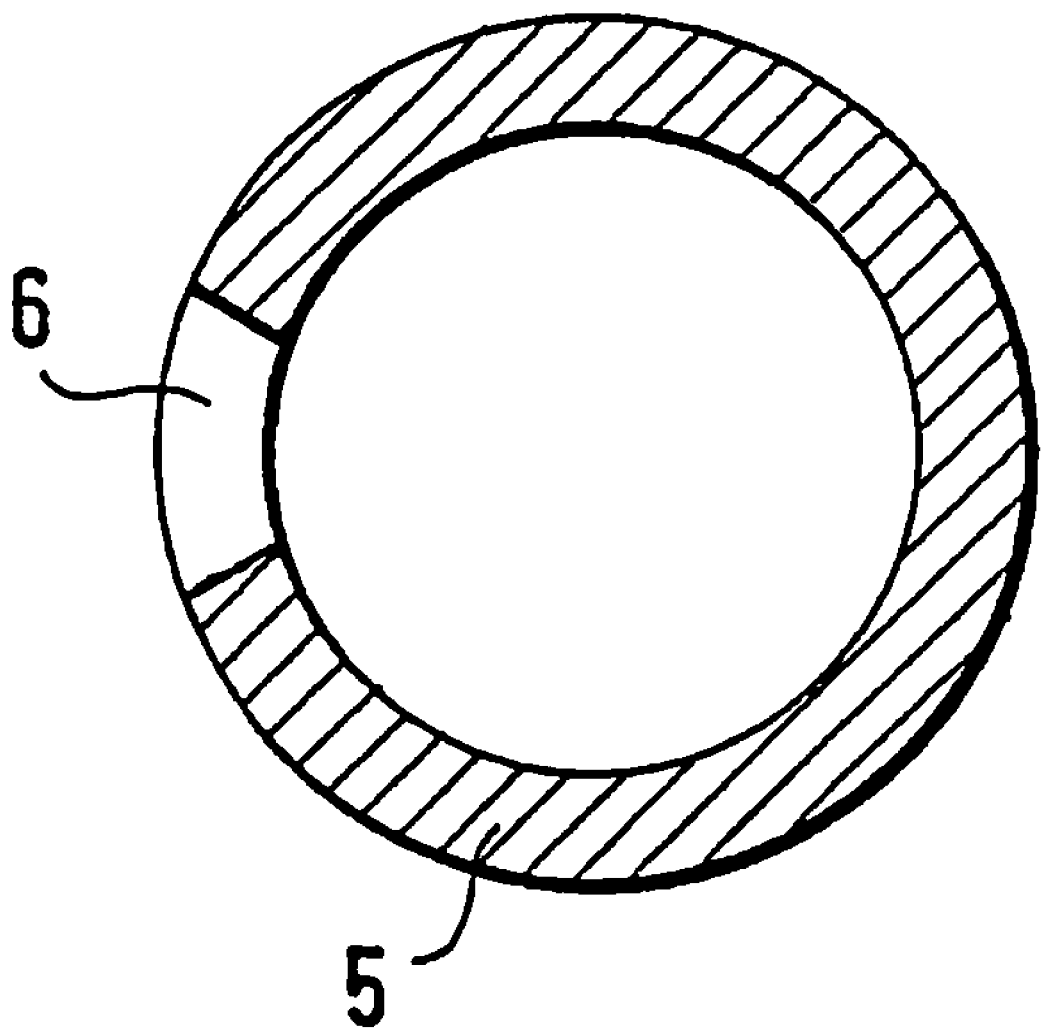
FIG. 2 shows a section through the centering ring or puddle containment in the plane indicated in FIG. 1 by the arrow A.
Figure 3:
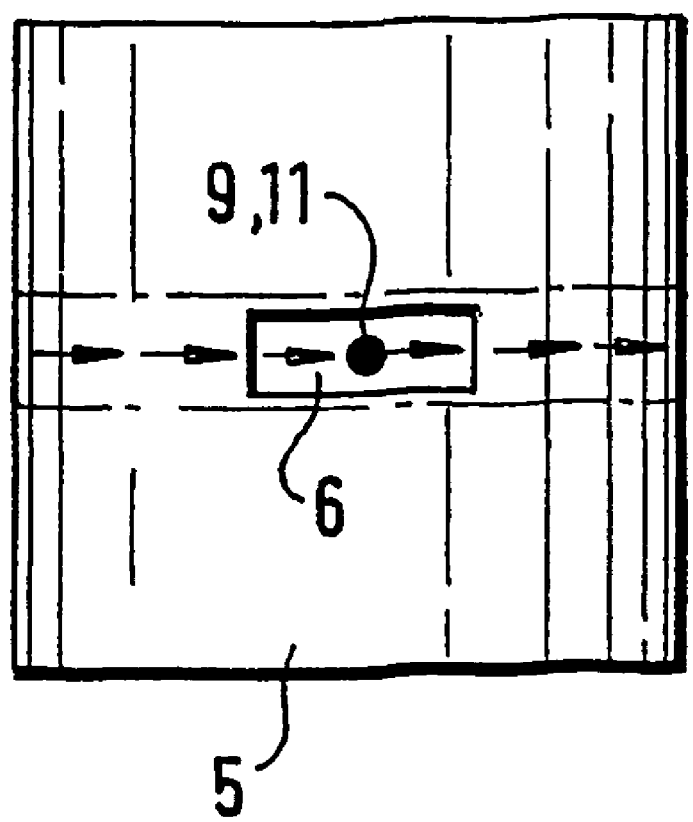
FIG. 3 shows a view of the centering ring or puddle containment from the side marked in FIG. 1 by the arrow A.

The third component 5 has a cavity 6, which serves for a root-side degassing of the weld puddle during the welding process. FIG. 2 shows a section through the third component 5 in a cutting plane designated by the arrow A in FIG. 1. FIG. 3 shows a view of the third component 5 from a side established by the arrow A in FIG. 1. The cavity 6 in this example of an embodiment is a slot of rectangular cross section passing completely through the wall of the component 5.

The three components 1, 3, 5 are connected together by means of a closed weld seam 7. Weld seam 7 is ring-shaped in this instance and begins at a start point 9 lying in the area of the cavity 6. Preferably, the start point 9 lies in the area of the middle of the cavity 6. At this start point 9, the first and second components 1, 3 are welded to one another. From there, the weld seam 7 runs annularly around the three components 1, 3, 5, connects all three components 1, 3, 5, and ends at an end point 11, which is the same as the start point 9.

In FIG. 3, the position of the weld seam 7 is indicated by arrows. The direction of the arrows shows the welding direction during the welding process. The start- and end-point 9, 11 of the weld seam is situated at the cavity and is shown by a large dot.

A weld connection of the invention is manufactured by first positioning the three components 1, 3, 5 in preparation for welding. Following this, the welding is begun in the area of the cavity 6, e.g. by applying the welding torch at the start point 9. The weld seam 7 is then drawn by continuous welding and ended at the end point 11, where it was begun in the area of the cavity 6.

The start- and end-point 9, 11 is a critical location for possible pore formation. In the weld connection of the invention, a cavity 6 in the third component 5 is, therefore, provided exactly at that location. The cavity cares during the welding process for a sufficient root-side degassing of the weld puddle. This assures that practically no more pores occur. The weld connection exhibits, consequently, a very high mechanical strength and a good corrosion resistance. Weld connections of the invention can, therefore, also be used for realizing a pressure-tight, e.g. flameproof, encapsulation.

The invention can be applied with great versatility. The first and second components 1, 3 are e.g. mutually connected parts of a pipeline. Equally as well, the first and second components 1, 3 can, however, also be arbitrarily shaped, other components, e.g. parts of a housing of a measuring device or the like, parts which have cylindrical end pieces.

The third component 5 can be e.g. a centering ring, which serves for arranging the first and second components 1, 3 with respect to one another with an exact fit without edge offset. Likewise, the third component 5 can also be a puddle containment, which serves to prevent a root break through during the welding, i.e. an escape of molten material into the interior of the first and second components. In this case also, the first and second components 1, 3 are pushed onto the puddle containment.

Figure 4:
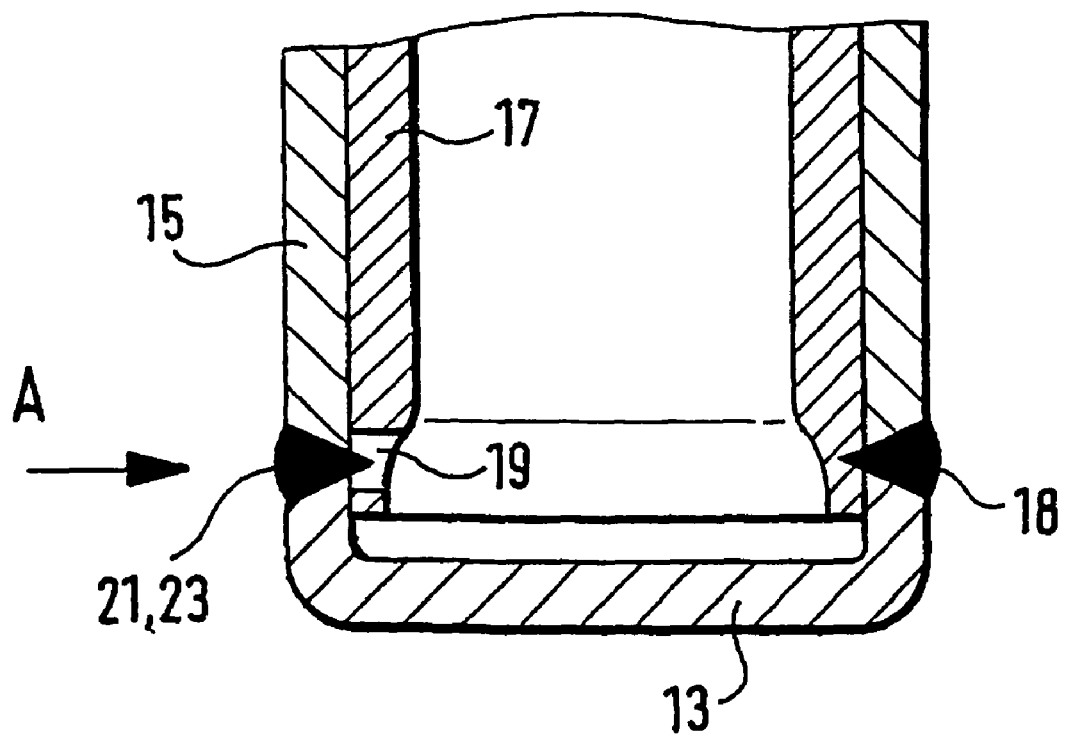
FIG. 4 shows a weld connection between a membrane, a tube and an internally situated holder.

FIG. 4 illustrates another example of an embodiment of a weld connection of the invention. This embodiment has first, second and third components 13, 15, 17. The first component 13 is a membrane, or diaphragm, the second component 15 a tube and the third component 17 a holder inserted into the tube. The membrane closes the tube, in the manner of the bottom of a pot, and lies with a washer-shaped end surface against an equally-shaped end surface of the tube. The third component 17, the holder, is inserted into the second component 15 and lies with an outer, lateral surface situated tightly against the first and second components 13, 15 in the area of the two end surfaces.

The membrane is e.g. part of a sensor, or measuring pickup, and the holder can be a holder for a measuring- and/or evaluation-electronics unit.

Figure 5:
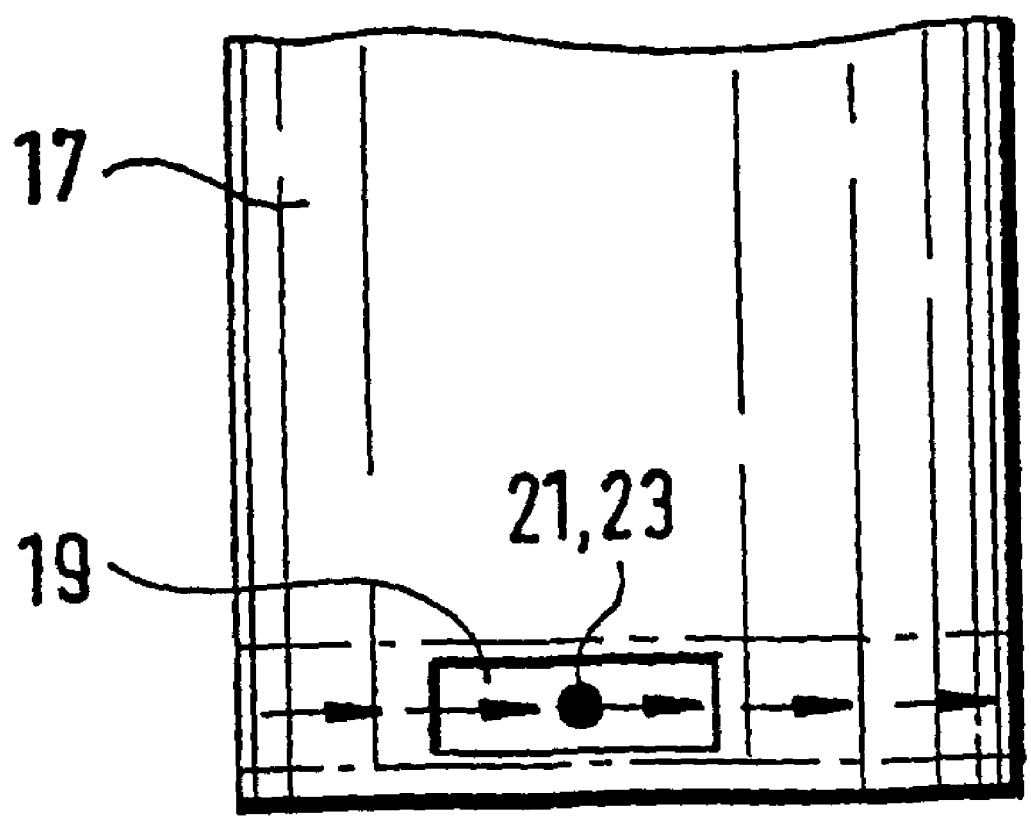
FIG. 5 shows a view of the holder of FIG. 4 from a side indicated in FIG. 4 by the arrow A.

At the level of the two end surfaces runs a closed weld seam 18, by way of which the first, second and third components 13, 15, 17 are connected with one another. In accordance with the invention, also in this embodiment there is a component, here the third component 17, which has a cavity 19 located at a start- and end-point 21, 23 of the weld seam 18 and serving for the root-side degassing of the weld puddle. FIG. 5 shows a view of the holder of FIG. 4 onto a side as indicated by the arrow A of FIG. 4.*a*)*b*)

The invention claimed is:

1. A weld connection between a first, a second and a third component with a closed weld seam defining a start-and-end point, wherein:
    said components are connected with one another by means of said closed weld seam, said closed weld seam engaging each component; and
    one component has, at said start- and end-point of said weld seam, a cavity, which serves the purpose of enabling root-side degassing of a weld puddle.

2. The weld connection as claimed in claim 1, wherein:
    said third component is a centering ring, onto which said first and second components are pushed.

3. The weld connection as claimed in claim 1, wherein:
    said third component is a puddle containment, onto which said first and second components are pushed.

4. The weld connection as claimed in claim 1, wherein:
    said first component is a membrane, said second component a tube and said third component a holder inserted into said tube.

5. A method for manufacturing a weld connection as claimed in claim 1 comprising a first, a second and a third component, with one of the components defining a cavity, the method comprising the steps of:
    positioning the first, second and third components in preparation for welding;
    beginning the welding in the area of the cavity;
    continuing the welding without interruption; and
    ending the welding where it was begun in the area of the cavity.

\* \* \* \* \*